United States Patent
Fujiwara

(10) Patent No.: US 12,537,889 B2
(45) Date of Patent: Jan. 27, 2026

(54) ADHESIVE MEMBER AND DISPLAY DEVICE INCLUDING THE ADHESIVE MEMBER

(71) Applicant: Samsung Display Co., Ltd., Yongin-Si (KR)

(72) Inventor: Tetsuya Fujiwara, Yokohama (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 745 days.

(21) Appl. No.: 17/868,248

(22) Filed: Jul. 19, 2022

(65) Prior Publication Data
US 2023/0126251 A1   Apr. 27, 2023

(30) Foreign Application Priority Data
Oct. 27, 2021   (KR) .................. 10-2021-0144439

(51) Int. Cl.
*H04M 1/02*   (2006.01)
*C09J 133/08*   (2006.01)

(52) U.S. Cl.
CPC ......... *H04M 1/0268* (2013.01); *C09J 133/08* (2013.01)

(58) Field of Classification Search
None
See application file for complete search history.

(56) References Cited

U.S. PATENT DOCUMENTS

| | | | | |
|---|---|---|---|---|
| 4,920,157 A | * | 4/1990 | Schulz | C08G 18/6692 525/920 |
| 8,957,156 B2 | * | 2/2015 | Kim | C08G 18/718 522/90 |
| 10,174,224 B2 | | 1/2019 | Yoon et al. | |
| 11,732,077 B2 | * | 8/2023 | Yamamoto | C08F 290/067 428/339 |
| 11,898,066 B2 | * | 2/2024 | Fujiwara | C09J 175/16 |
| 12,168,739 B2 | * | 12/2024 | Fujiwara | G02B 1/14 |
| 2021/0214482 A1 | * | 7/2021 | Morita | C08F 2/50 |
| 2021/0246338 A1 | | 8/2021 | Takarada et al. | |
| 2021/0292536 A1 | * | 9/2021 | Fujiwara | C08G 83/007 |
| 2022/0135785 A1 | * | 5/2022 | Yamamoto | C09J 133/14 522/96 |
| 2022/0144989 A1 | * | 5/2022 | Yamamoto | C08F 220/20 |
| 2023/0136807 A1 | * | 5/2023 | Fujiwara | C09J 175/16 428/841 |
| 2023/0139019 A1 | * | 5/2023 | Yamamoto | C08F 222/1065 522/96 |
| 2023/0159801 A1 | * | 5/2023 | Fujiwara | C09J 5/00 156/331.4 |

FOREIGN PATENT DOCUMENTS

| | | |
|---|---|---|
| JP | 2003138234 A * | 5/2003 |
| JP | 2015-531804 | 11/2015 |
| JP | 5826639 | 12/2015 |
| JP | 2017-095659 | 6/2017 |
| JP | 2018-045213 | 3/2018 |
| JP | 2019-061323 | 4/2019 |
| JP | 6523098 | 5/2019 |
| JP | 2019-089975 | 6/2019 |
| JP | 2019-099714 | 6/2019 |
| JP | 6757479 | 9/2020 |
| KR | 10-1385042 | 4/2014 |
| KR | 10-2020-0139623 | 12/2020 |
| KR | 10-2021-0076600 | 6/2021 |
| WO | 2014-027788 | 2/2014 |

* cited by examiner

*Primary Examiner* — Sanza L. McClendon
(74) *Attorney, Agent, or Firm* — F. CHAU & ASSOCIATES, LLC

(57) ABSTRACT

An adhesive member includes: a polymer derived from a resin composition including at least one (meth)acrylate monomer, at least one urethane (meth)acrylate oligomer, and at least one photoinitiator; a 180° peel force of about 2000 gf/25 mm to less than about 8000 gf/25 mm for a glass substrate at a temperature of about −20° C.; and a thermal expansion stress of about 0.1 N/mm$^2$ to less than about 2 N/mm$^2$ in accordance with changes in temperature from about −20° C. to about 60° C.

20 Claims, 8 Drawing Sheets

ADHESIVE MEMBER AND DISPLAY DEVICE INCLUDING THE ADHESIVE MEMBER

CROSS-REFERENCE TO RELATED APPLICATION

This U.S. non-provisional patent application claims priority under 35 U.S.C. § 119 to Korean Patent Application No. 10-2021-0144439, filed on Oct. 27, 2021, the disclosure of which is incorporated by reference herein in its entirety.

TECHNICAL FIELD

The present inventive concept relates to an adhesive member formed from a resin composition and a display device including the adhesive member.

DISCUSSION OF THE RELATED ART

Various display devices used for multimedia devices such as a television, a mobile phone, a tablet computer, a navigation system, and a portable gaming device are currently under development. Recently, to facilitate portability and improve user convenience, display devices are being developed to be foldable, bendable, or rollable by being provided with flexible display members.

It is desirable that each of the components used in a flexible display device secure reliability during a folding or bending operation. In addition, an adhesive resin, which is used for forming an adhesive layer and may be applied to display devices in various shapes, should have application stability for components of various types of display devices.

SUMMARY

According to an embodiment of the present inventive concept, an adhesive member includes: a polymer derived from a resin composition including at least one (meth)acrylate monomer, at least one urethane (meth)acrylate oligomer, and at least one photoinitiator; a 180° peel force of about 2000 gf/25 mm to less than about 8000 gf/25 mm for a glass substrate at a temperature of about −20° C.; and a thermal expansion stress of about 0.1 N/mm$^2$ to less than about 2 N/mm$^2$ in accordance with changes in temperature from about −20° C. to about 60° C.

In an embodiment of the present inventive concept, the adhesive member has a glass transition temperature of −70° C. to lower than −30° C.

In an embodiment of the present inventive concept, the adhesive member has a 180° peel force of about 400 gf/25 mm or greater at a temperature of about 60° C.

In an embodiment of the present inventive concept, the resin composition has a viscosity of about 5 centipoise (cP) to less than about 50 cP as measured at a temperature of about 25° C.

In an embodiment of the present inventive concept, the (meth)acrylate monomer has an weight-average molecular weight of about 100 to about 500.

In an embodiment of the present inventive concept, the urethane (meth)acrylate oligomer has an weight-average molecular weight of about 10,000 to less than about 40,000.

In an embodiment of the present inventive concept, the urethane (meth)acrylate oligomer includes a plurality of acryl groups.

In an embodiment of the present inventive concept, the resin composition further includes an organic solvent of about 1 wt % or less based on a total weight of the resin composition.

According to an embodiment of the present inventive concept, a display device includes: a display panel; a window disposed on the display panel; and an adhesive member disposed between the display panel and the window, and including a polymer derived from a resin composition having at least one (meth)acrylate monomer, at least one urethane (meth)acrylate oligomer, and at least one photoinitiator, wherein the adhesive member has a 180° peel force of about 2000 gf/25 mm to less than about 8000 gf/25 mm for a glass substrate at a temperature of about −20° C., and a thermal expansion stress of about 0.1 N/mm$^2$ to less than about 2 N/mm$^2$ in accordance with changes in temperature from about −20° C. to about 60° C.

In an embodiment of the present inventive concept, the adhesive member has a 180° peel force of about 400 gf/25 mm or greater at a temperature of about 60° C.

In an embodiment of the present inventive concept, the adhesive member has a glass transition temperature of about −70° C. to lower than about −30° C.

In an embodiment of the present inventive concept, the resin composition further includes an organic solvent of about 1 wt % or less based on a total weight of the resin composition.

In an embodiment of the present inventive concept, the resin composition has a viscosity of about 5 cP to less than about 50 cP as measured at a temperature of about 25° C.

In an embodiment of the present inventive concept, the adhesive member has a thickness of about 50 μm to about 200 μm.

In an embodiment of the present inventive concept, the adhesive member is formed by providing the resin composition on a first surface of the window or on a first surface of the display panel, and by using ultraviolet curing on the provided resin composition.

In an embodiment of the present inventive concept, the display device further includes: a light control layer disposed between the adhesive member and the window; and an optical adhesive layer disposed between the light control layer and the window, wherein the optical adhesive layer includes a polymer derived from the resin composition.

In an embodiment of the present inventive concept, the optical adhesive layer has a 180° peel force of about 2000 gf/25 mm to less than about 8000 gf/25 mm at a temperature of about −20° C.

In an embodiment of the present inventive concept, the optical adhesive layer has a 180° peel force of about 400 gf/25 mm or greater at a temperature of about 60° C.

In an embodiment of the present inventive concept, the display device further includes an input sensing unit disposed on the display panel, wherein the adhesive member is disposed between the display panel and the input sensing unit or between the input sensing unit and the window.

In an embodiment of the present inventive concept, at least one folding region is defined in the display device, where the folding region has a radius of curvature of about 5 mm or less.

BRIEF DESCRIPTION OF THE DRAWINGS

The above and other features of the present inventive concept will become more apparent by describing in detail embodiments thereof with reference to the attached drawings, in which.

DETAILED DESCRIPTION OF THE EMBODIMENTS

Figure 1A:
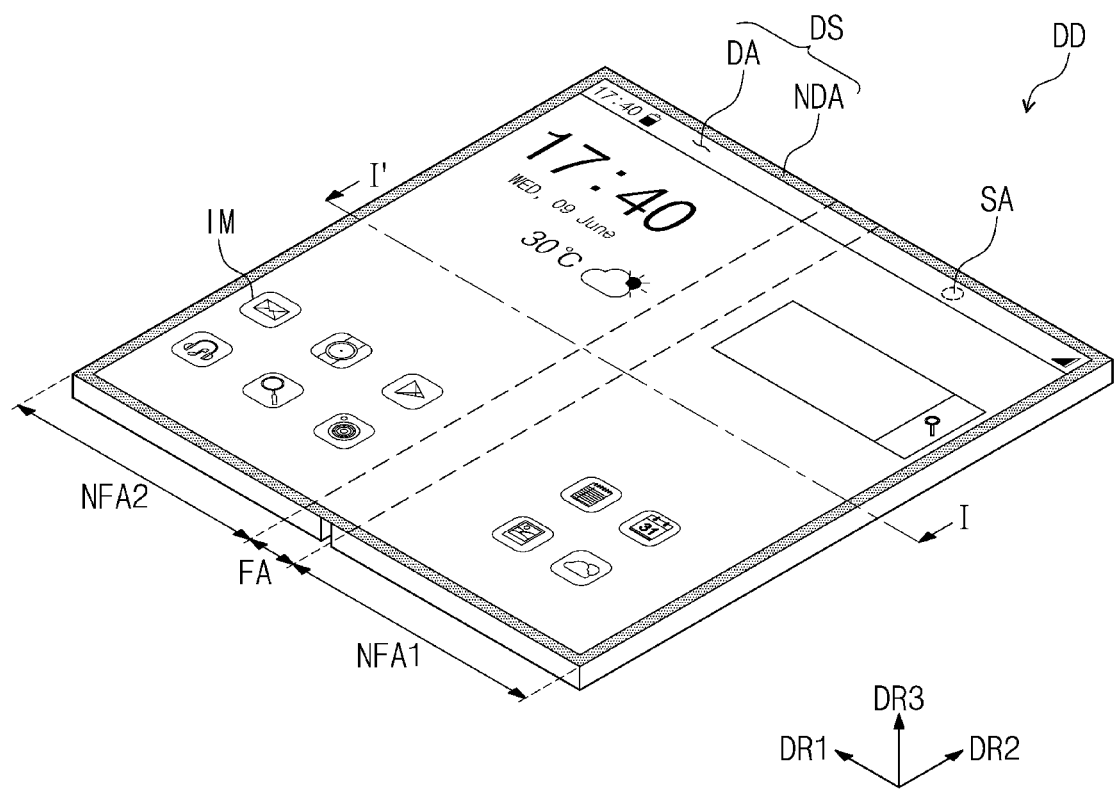
FIG. 1A is a perspective view of a display device according to an embodiment of the present inventive concept.

The present inventive concept may be variously modified and realized in many different forms, and thus specific embodiments will be exemplified in the description below in conjunction with the drawings. It should be understood, however, that it is not intended to limit the present inventive concept to the particular forms disclosed, but rather, is intended to cover all modifications, equivalents, and alternatives falling within the spirit and scope of the present inventive concept.

In the present disclosure, when an element (or a region, a layer, a portion, and the like) is referred to as being "on," "connected to," or "coupled to" another element, the element may be directly disposed on, directly connected to or coupled to the other element, or an intervening element may be disposed therebetween.

Like reference numerals may refer to like elements throughout the specification. In addition, in the drawings, the thicknesses, the ratios, and the dimensions of elements may be exaggerated for clarity. The term "and/or," includes all combinations of one or more of the associated listed items.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the spirit and scope of the present inventive concept. The terms of a singular form may include plural forms unless the context clearly indicates otherwise. As used herein, the singular forms, "a", "an" and "the" are intended to include the plural forms as well, unless the context clearly indicates otherwise.

In addition, terms such as "below," "lower," "above," "upper," and the like may be used to describe the relationship between the components shown in the drawings. It will be understood that the spatially relative terms are intended to encompass different orientations of the device in use or operation in addition to the orientation depicted in the figures. For example, if the device in the figures is turned over, components described as "below" or "beneath" other components or features would then be oriented "above" the other components or features. The terms are used as a relative concept and may be described with reference to the direction indicated in the drawings.

Hereinafter, an adhesive member according to an embodiment of the present inventive concept and a display device according to an embodiment of the present inventive concept including the adhesive member will be described with reference to the accompanying drawings.

Figure 1B:
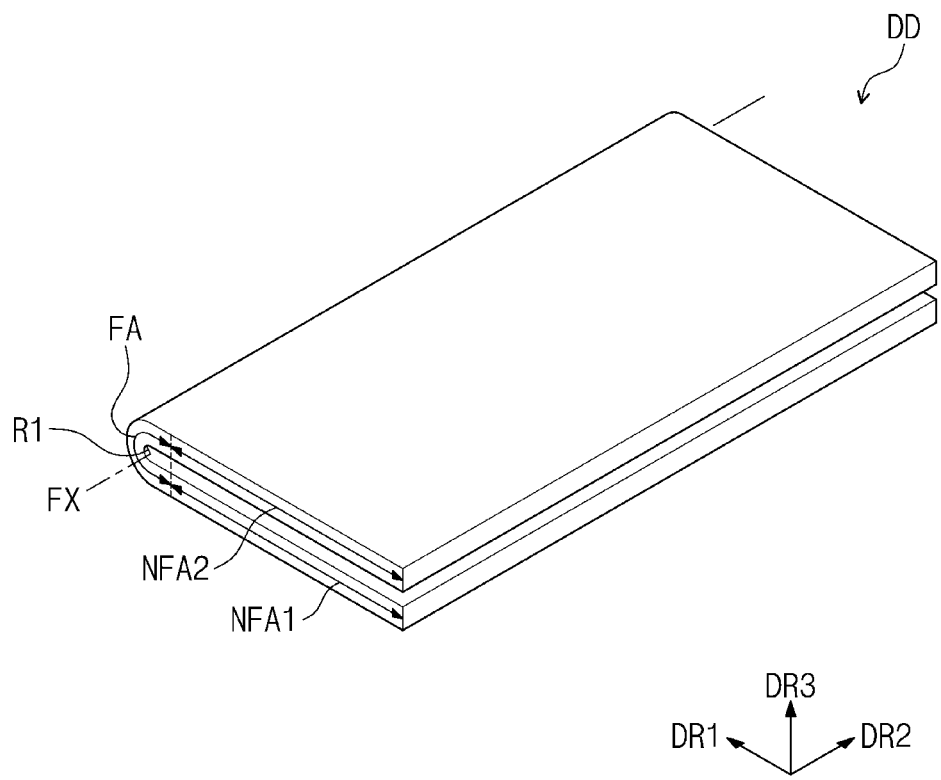
FIG. 1B is a view illustrating the display device illustrated in FIG. 1A in a folded state.

FIG. 1A is a perspective view of a display device according to an embodiment of the present inventive concept. FIG. 1B is a view illustrating the display device illustrated in FIG. 1A in a folded state. A display device DD according to an embodiment of the present inventive concept may be a flexible display device which may be foldable or bendable, or which may be maintained to be in a folded state or bent state. In the present specification, being flexible refers to having properties of being able to be bent, which might not be limited to a structure being bent and completely folded, but may include a structure being bent to a degree of, for example, a few nanometers (nm).

Referring to FIG. 1A and FIG. 1B, the display device DD may be a device activated in accordance with an electrical signal. For example, the display device DD may be a personal digital terminal, a tablet computer, a car navigation system unit, a game console, or a wearable device, but the present inventive concept is not limited thereto. In FIG. 1A and FIG. 1B, as an example, the display device DD is illustrated as a portable electronic device.

Referring to FIG. 1A, the display device DD according to an embodiment of the present inventive concept may include a display surface DS extending in a first direction axis DR1 and a second direction axis DR2 crossing the first direction axis DR1. The display device DD may provide an image IM to a user through the display surface DS.

The display surface DS may include a display region DA and a non-display region NDA adjacent to the display region DA. The display region DA may display the image IM, and the non-display region NDA might not display the image IM. The non-display region NDA may at least partially surround the display region DA. However, the embodiment of the present inventive concept is not limited thereto. The shape of the display region DA and the shape of the non-display region NDA may be changed.

The display surface DS may further include a sensing region SA. The sensing region SA may be a part of the display region DA. The sensing region SA may have a transmittance higher than that of the display region DA. Through the sensing region SA, an optical signal, for example, visible light or infrared light may move. The display device DD may include an electronic module which captures an external image through the visible light passing through the sensing region SA, or determines proximity of an external object through the infrared light. In FIG. 1A, one sensing region SA is illustrated as an example, but the embodiment of the present inventive concept is not limited thereto. For example, the sensing region SA may be provided in plurality.

The thickness direction of the display device DD may be a direction parallel to a third direction axis DR3, which is a normal direction with respect to a plane defined by the first direction axis DR1 and the second direction axis DR2. Directions indicated by the first to third direction axes DR1, DR2, and DR3 described in the present specification are a relative concept, and may be converted into different directions. In addition, the directions indicated by the first to third direction axes DR1, DR2, and DR3 may be described as first to third directions, and may be denoted by the same reference numerals. In the present specification, the first direction axis DR1 and the second direction axis DR2 are substantially perpendicular to each other, and the third direction axis DR3 may be a normal direction with respect to a plane defined by the first direction axis DR1 and the second direction axis DR2.

The display device DD may include a folding region FA and a plurality of non-folding regions NFA1 and NFA2. The non-folding regions NFA1 and NFA2 may include a first non-folding region NFA1 and a second non-folding region NFA2. The first non-folding region NFA1, the folding region FA, and the second non-folding region NFA2 may be sequentially disposed parallel to the first direction axis DR1. For example, the folding region FA may be disposed between the first non-folding region NFA1 and the second non-folding region NFA2.

The display device DD of FIG. 1A and FIG. 1B is illustrated as including one folding region FA and two non-folding regions NFA1 and NFA2, but the number of folding regions and the number of non-folding regions are not limited thereto. For example, a display device may include three or more non-folding regions and two or more folding regions disposed between adjacent non-folding regions.

As illustrated in FIG. 1B, the folding region FA may be folded with respect to a folding axis FX parallel to the second direction axis DR2. The folding region FA may have a predetermined curvature and a predetermined radius of curvature R1. For example, the radius of curvature R1 of the folding region FA may be about 5 mm or less.

When the display device DD is folded, the non-folding regions NFA1 and NFA2 may face each other. When the display device DD is completely folded, the display surface DS might not be exposed to the outside, which may be referred to as in-folding. In addition, when the display device DD according to an embodiment of the present inventive concept is completely folded, the display surface DS may be exposed to the outside, which may be referred to as outer-folding.

Figure 2:
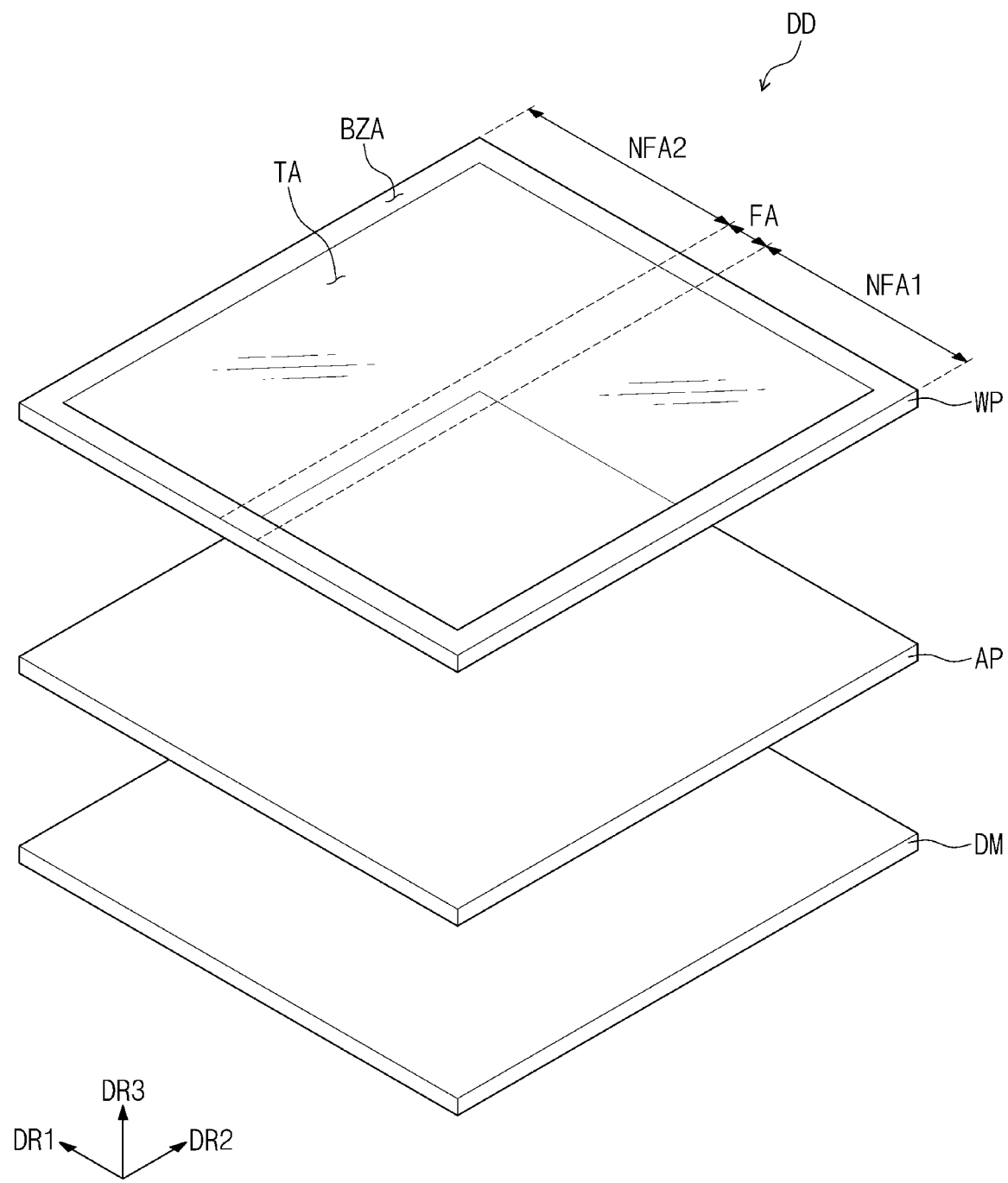
FIG. 2 is an exploded perspective view of a display device according to an embodiment of the present inventive concept.
Figure 3:
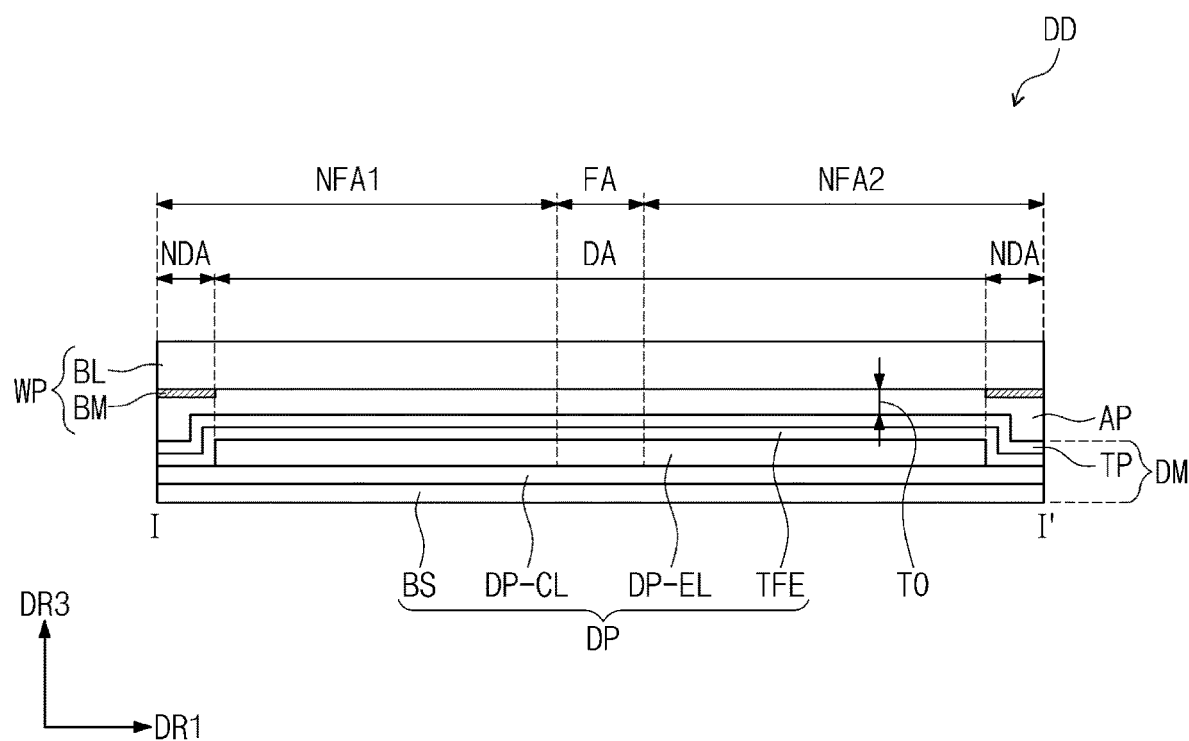
FIG. 3 is a cross-sectional view of a display device according to an embodiment of the present inventive concept.

FIG. 2 is an exploded perspective view of the display device DD according to an embodiment of the present inventive concept. FIG. 3 illustrates a cross-sectional view of the display device DD along line I-I' of FIG. 1, according to an embodiment of the present inventive concept.

The display device DD according to an embodiment of the present inventive concept may include a display module DM, and a window WP disposed on the display module DM. In the display device DD according to an embodiment of the present inventive concept, the display module DM may include a display panel DP including a display element layer DP-EL and an input sensing unit TP disposed on the display panel DP. The display device DD according to an embodiment of the present inventive concept may include an adhesive member AP disposed between the display panel DP and the window WP. For example, the adhesive member AP may be disposed between the input sensing unit TP and the window WP. The adhesive member AP may be, for example, an optically clear adhesive (OCA) film or an optically clear adhesive (OCR) resin layer.

The adhesive member AP according to an embodiment of the present inventive concept may include a polymer derived from a resin composition. The resin composition according to an embodiment of the present inventive concept may include at least one (meth)acrylate monomer, at least one urethane (meth)acrylate oligomer, and at least one photoinitiator. In addition, the resin composition according to an embodiment of the present inventive concept may have a viscosity of about 5 centipoise (cP) to less than about 50 cP as measured at a temperature of about 25° C. according to JISK2283. The resin composition having a viscosity of about 5 cP to less than about 50 cP as measured at a temperature of about 25° C. according to JISK2283 may be applied by methods such as an inkjet printing method or dispensing application method. The resin composition having a viscosity of about 5 cP to less than about 50 cP as measured at a temperature of about 25° C. according to, for example, JISK2283, may be precisely applied when a resin composition is provided. For example, the resin composition having a viscosity of about 5 cP to less than about 50 cP as measured at a temperature of about 25° C. according to JISK2283 may be provided in a substantially uniform thickness and substantially uniform amount from a device used for applying a resin composition.

In addition, when the viscosity of the resin composition is less than about 5 cP, the resin composition may flow while on the portion to which the resin composition is provided, so that it might not be easy to form an adhesive member. When the viscosity of the resin composition is about 50 cP or greater, it might not be easy to provide an adhesive member by an inkjet printing method or dispensing application method. When the viscosity of the resin composition is about 50 cP or greater, a resin composition might not be discharged in a substantially uniform amount and at a substantially uniform rate from a device used for applying a resin composition.

In an embodiment of the present inventive concept, the adhesive member AP formed from the resin composition may have a thermal expansion stress of about 0.1 N/mm$^2$ to less than about 2 N/mm$^2$ in accordance with changes in temperature from about −20° C. to about 60° C. The thermal expansion stress may be calculated as a value obtained by multiplying an elastic modulus, a thermal expansion coefficient, and an amount of temperature change, and the thermal expansion coefficient and the elastic modulus correspond to unique properties of a material.

The adhesive member AP having a thermal expansion stress of about 0.1 N/mm$^2$ to less than about 2 N/mm$^2$ in accordance with changes in temperature from about −20° C. to about 60° C. may exhibit properties of having good stress change in accordance with changes in temperature. The adhesive member AP exhibiting properties of having good stress change in accordance with changes in temperature may exhibit properties of having excellent reliability even when exposed to rapid temperature changes when in a folded state. Accordingly, the display device DD including the adhesive member AP according to an embodiment of the present inventive concept may exhibit properties of having increased reliability when folding and unfolding of the display device DD are repeated in accordance with changes in temperature.

Repeated folding and unfolding of the display device might not be facilitated when an adhesive member has a thermal expansion stress of less than about 0.1 N/mm$^2$ in accordance with changes in temperature from about −20° C. to about 60° C., or has a thermal expansion stress of about 2 N/mm$^2$ or greater in accordance with changes in temperature from about −20° C. to about 60° C. An adhesive member whose repeated folding and unfolding is not facilitated may be peeled off from a display device, or damaged.

The adhesive member AP according to an embodiment of the present inventive concept may have a glass transition temperature (Tg) of about −70° C. to lower than about −30° C. The polymer may indicate that the behavior of molecules in a solid state at a temperature before the glass transition temperature, and may represent the behavior of an elastomer at a temperature between a temperature after the glass transition temperature and a melting point. The adhesive member AP having a glass transition temperature of about −70° C. to lower than about −30° C. may exhibit flexible properties even in a low-temperature environment. Accordingly, the display device DD including the adhesive member AP according to an embodiment of the present inventive concept may exhibit flexible properties even in a low-temperature environment, and may exhibit excellent reliability when folding and unfolding of the adhesive member AP are repeated.

The adhesive member AP may have a 180° peel force of about 2000 gf/25 mm to less than about 8000 gf/25 mm for a glass substrate at a temperature of about 0° C. or lower. The adhesive member AP may have a 180° peel force of about 2000 gf/25 mm to less than about 8000 gf/25 mm for a glass substrate at a temperature of about −20° C. The adhesive member AP having a 180° peel force of about 2000 gf/25 mm to less than about 8000 gf/25 mm at a temperature of about 0° C. or lower, for example, at a temperature of about −20° C., may exhibit properties of having high adhesion reliability in a low-temperature environment.

The adhesive member AP may have a 180° peel force of about 400 gf/25 mm or greater for a glass substrate at a temperature of about 40° C. or higher. The adhesive member AP may have a 180° peel force of about 400 gf/25 mm or greater for a glass substrate at a temperature of about 60° C. The adhesive member AP having a 180° peel force of about 400 gf/25 mm or greater at a temperature of 40° C. or higher, for example, at a temperature of about 60° C., may exhibit properties of having high adhesion reliability in a high-temperature environment.

The adhesive member AP whose 180° peel force in low-temperature and high-temperature environments satisfies the above-described range may exhibit properties of having increased reliability when folding and unfolding of the adhesive member AP are repeated. Accordingly, the display device DD including the adhesive member AP according to an embodiment of the present inventive concept may exhibit properties of having increased reliability when folding and unfolding of the adhesive member AP are repeated.

The adhesive member AP may be formed from a resin composition including at least one (meth)acrylate monomer, at least one urethane (meth)acrylate oligomer, and at least one photoinitiator. In the present specification, (meth)acrylate includes acrylate and methacrylate. The (meth)acrylate may include at least one (meth)acryloyl group.

The (meth)acrylate monomer may have an weight-average molecular weight (Mw) of about 100 to about 500. For example, the (meth)acrylate monomer may have an weight-average molecular weight (Mw) of about 100 to about 300.

The (meth)acrylate monomer may include at least one (meth)acryloyl group. In addition, in the present specification, the (meth)acryloyl group represents an acryloyl group or a methacryloyl group, and (meth)acryl represents acryl or methacryl.

In the resin composition according to an embodiment of the present inventive concept, a (meth)acrylate monomer may include at least one acryloyl group or at least one methacryloyl group per monomer unit. For example, the (meth)acryllate monomer may be an acrylate monomer or a methacrylate monomer including one acryloyl group or one methacryloyl group. In the resin composition, the (meth)acryllate monomer may include at least one of an alicyclic (meth)acrylate, a hydroxyl group-containing (meth)acrylate, an alkyl (meth)acrylate, or an aromatic (meth)acrylate.

For example, based on the total weight of the resin composition, the weight of the (meth)acrylate monomer may be about 70 wt % or greater. For example, based on the total weight of the resin composition, the weight of the (meth)acrylate monomer may be about 80 wt % or greater. When the resin composition includes one (meth)acrylate monomer, the weight of the one (meth)acrylate monomer may be about 80 wt % or greater based on the total weight of the resin composition. On the contrary, when the resin composition includes a plurality of (meth)acrylate monomers, the sum of weights of the plurality of (meth)acrylate monomers may be about 80 wt % or greater based on the total weight of the resin composition. However, this is only an example. Based on the total weight of the resin composition, the weight of the (meth)acrylate monomer is not limited thereto.

The resin composition may include at least one urethane (meth)acrylate oligomer. The urethane (meth)acrylate oligomer may include a plurality of acryl groups. The urethane (meth)acrylate oligomer may have an weight-average molecular weight of about 10,000 to less than about 40,000. A urethane (meth)acrylate oligomer having an weight-average molecular weight of about 10,000 or greater is included in the resin composition while being in the state of an oligomer having a relatively high degree of polymerization and maintains the high degree of polymerization even after photocuring, and thus, may exhibit high peel force properties.

For example, based on the total weight of the resin composition, the weight of the urethane(meth)acrylate oligomer may be about 5 wt % to about 15 wt %. When the resin composition includes one urethane (meth)acrylate oligomer, based on the total weight of the resin composition, the weight of the urethane(meth)acrylate oligomer may be about 5 wt % to about 15 wt %. In addition, when the resin composition includes a plurality of urethane (meth)acrylate oligomers, based on the total weight of the resin composition, the sum of weights of the plurality of urethane(meth)acrylate oligomers may be about 10 wt % to about 15 wt %. However, this is only an example. Based on the total weight of the resin composition, the weight of the urethane(meth)acrylate oligomer is not limited thereto.

For example, the resin composition may include at least one of iso-decyl acrylate (IDAA), 2-ethylhexyl acrylate (2-EHA), 4-hydroxybutyl acrylate (4-HBA), hydroxyethyl acrylate (HEA), or 1,9-nonanediol diacrylate (e.g., Viscoat #260) as the (metho)acrylate monomer. For example, the resin composition may include at least one of UF-0052 (e.g., KYOEISHA CHEMICAL Co., Ltd.) or UV-3700B (e.g., Mitsubishi Chemical Co., Ltd.) as the urethane (meth)acrylate oligomer. However, this is only an example, and the embodiment of the present inventive concept is not limited thereto.

The resin composition may include at least one photoinitiator. When the resin composition includes a plurality of photoinitiators, different photoinitiators may be activated by ultraviolet light with different center wavelengths.

For example, the photoinitiator may include at least one of 2,2-dimethoxy-1,2-diphenylethan-1-one, 1-hydroxy-cyclohexyl-phenyl-ketone, 2-hydroxy-2-methyl-1-phenyl propanone, 2-hydroxy-1-[4-(2-hydroxyethoxy)phenyl]-2-methyl-1-propanone, or 2-hydroxy-1-{4-[4-(2-hydroxy-2-methyl-propionyl)-benzyl]-phenyl}-2-methylpropan-1-one.

In addition, the photoinitiator may include at least one of 2-methyl-1[4-(methylthio)phenyl]-2-morpholinopropan-1-one, 2-benzyl-2-dimethylamino-1-(4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, ethyl (2,4,6-trimethylbenzoyl)phenyl phosphinate, bis(2,4,6-trimethylbenzoyl)-phenylphosphineoxide, [1-(4-phenylsulfanylbenzoyl)heptylideneamino]benzoate, [1-[9-ethyl-6-(2-methylbenzoyl)carbazol-3-yl]ethylideneamino] acetate, or bis(2,4-cyclopentadienyl)bis[2,6-difluoro-3-(1-pyrryl)phenyl] titanium(IV). In addition, the resin composition may include at least one of Omnirad (e.g., IGM Resins Co., Ltd.), Omnirad819 (e.g., IGM Resins Co., Ltd.), or Esacure 3644 (e.g., IGM Resins Co., Ltd.) as the photoinitiator.

In addition, the resin composition according to an embodiment of the present inventive concept may further include an organic solvent. The organic solvent may be included in an amount of about 1 wt % or less based on the total weight of the resin composition. The adhesive member AP formed from the resin composition, which includes the organic solvent in an amount of about 1 wt % or less, may have increased production efficiency since a process for drying the organic solvent may be omitted. For example, the organic solvent may include at least one methyl ethyl ketone (MEK), ethanol, or acetone. However, this is only an example. The type of the organic solvent included in the resin composition is not limited thereto.

Referring to FIG. 3, the display panel DP may include a base substrate BS, a circuit layer DP-CL disposed on the base substrate BS, a display element layer DP-EL disposed on the circuit layer DP-CL, and an encapsulation layer TFE covering the display element layer DP-EL. For example, the display panel DP may include a plurality of organic light emitting elements or a plurality of quantum dot light emitting elements in the display element layer DP-EL. The circuit layer DP-CL may include a plurality of transistors.

The configuration of the display panel DP illustrated in FIG. 3 is an example, so the configuration of the display panel DP is not limited thereto. For example, the display panel DP may include a liquid crystal element, in which the encapsulation layer TFE may be omitted.

The input sensing unit TP may be disposed on the display panel DP. For example, the input sensing unit TP may be directly disposed on the encapsulation layer TFE of the display panel DP. The input sensing unit TP senses an external input and changes the same into a predetermined input signal, and may provide the input signal to the display panel DP and/or a processor. For example, in the display device DD according to an embodiment of the present inventive concept, the input sensing unit TP may be a touch sensing unit configured to sense a touch. For example, the input sensing unit TP may recognize a direct touch of a user, an indirect touch of a user, a direct touch of an object, an indirect touch of an object, or the like.

In addition, the input sensing unit TP may sense at least one of the position of a touch and the intensity (e.g., pressure) of a touch, which are applied externally. The input sensing unit TP may have various configurations, and/or may be composed of various materials, but the present inventive concept is not limited to any one embodiment. The input sensing unit TP may include a plurality of sensing electrodes configured to sense an external input. The sensing electrodes may sense an external input in an electrostatic capacitive manner. The display panel DP is provided with an input signal from the input sensing unit TP, and may generate an image corresponding to the input signal.

The window WP may protect the display panel DP, the input sensing unit TP, and the like. The image IM generated in the display panel DP may be transmitted through the window WP to be provided to a user. The window WP may provide a touch surface of the display device DD. In the display device DD including the folding region FA, the window WP may be a flexible window.

The window WP may include a base layer BL and a print layer BM. The window WP may include a transmissive region TA and a bezel region BZA. The front surface of the window WP, which includes the transmissive region TA and the bezel region BZA, may correspond to the front surface of the display device DD.

The transmissive region TA may be an optically transparent region. The bezel region BZA may be a region having a relatively low light transmittance compared to the transmissive region TA. For example, the bezel region BZA may have a predetermined color. The bezel region BZA is adjacent to the transmissive region TA, and may at least partially surround the transmissive region TA. The bezel region BZA may provide the shape of the transmissive region TA. However, the present embodiment is not limited to what is illustrated. The bezel region BZA may be disposed adjacent to only one side of the transmissive region TA, or a portion of the bezel region BZA may be omitted.

The base layer BL may include, for example, a glass or plastic substrate. For example, a tempered glass substrate may be used as the base layer BL. In addition, the base layer BL may be formed of a polymer resin having flexibility. For example, the base layer BL may be made of polyimide, polyacrylate, polymethylmethacrylate, polycarbonate, polyethylenenaphthalate, polyvinylidene chloride, polyvinylidene difluorid, polystyrene, an ethylene vinylalcohol copolymer, or a combination thereof. However, the present embodiment of the present inventive concept is not limited thereto. For example, any common type of material known for being included in the base layer BL of the window WP may be used without limitation.

The print layer BM may be disposed on one surface of the base layer BL. For example, the print layer BM may be provided on a lower surface of the base layer BL, which faces the display module DM. The print layer BM may be disposed in an edge region of the base layer BL. For example, the print layer BM may be an ink print layer. In addition, the print layer BM may be a layer formed by including a pigment or a dye. In the window \VP, the bezel region BZA may be a portion in which the print layer BM is provided and overlaps.

In addition, the window WP may further include at least one functional layer provided on the base layer BL. For example, the functional layer may be a hard coating layer, an anti-fingerprint layer, and the like, but the present embodiment of the present inventive concept is not limited thereto.

The adhesive member AP included in the display device DD according to an embodiment of the present inventive concept may be formed by providing a liquid resin composition on one surface of the window WP or one surface of the display module DM, and by ultraviolet curing the liquid resin composition provided between the window WP and the display module DM. The one surface of the display module DM may be an upper surface or a lower surface of the display module DM, or may be one surface (e.g., an upper surface or a lower surface) of the display panel DP included in the display module DM.

In addition, the adhesive member AP may be provided by ultraviolet curing a liquid resin composition in a process separate from providing the adhesive member AP, followed by laminating one surface of the cured adhesive member AP in the form of an adhesive film on one surface of the window WP or one surface of the display module DM, and then attaching unattached one surface of the window WP or unattached one surface of the display module DM to the other surface (e.g., the remaining surface) of the adhesive member AP.

A thickness T0 of the adhesive member AP may be about 50 μm to about 200 μm. For example, the adhesive member AP may the thickness T0 of 50 μm to 100 μm. However, this is an example. The thickness T0 of the adhesive member AP is not limited thereto.

Figure 4A:
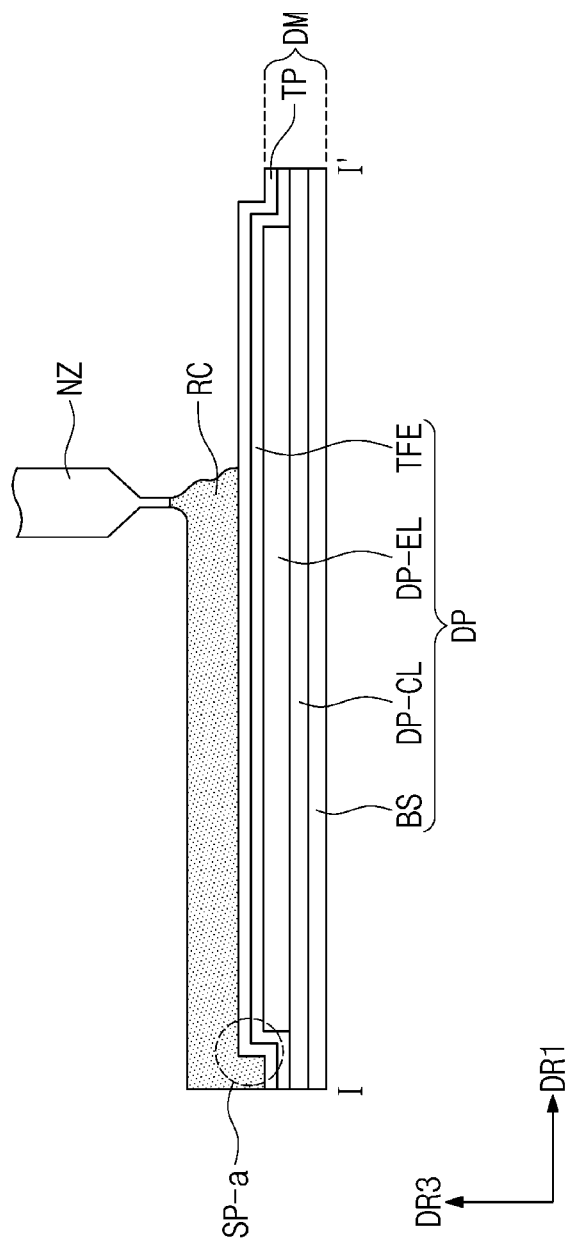
FIG. 4A is a view showing a method for preparing an adhesive member according to an embodiment of the present inventive concept.
Figure 4B:
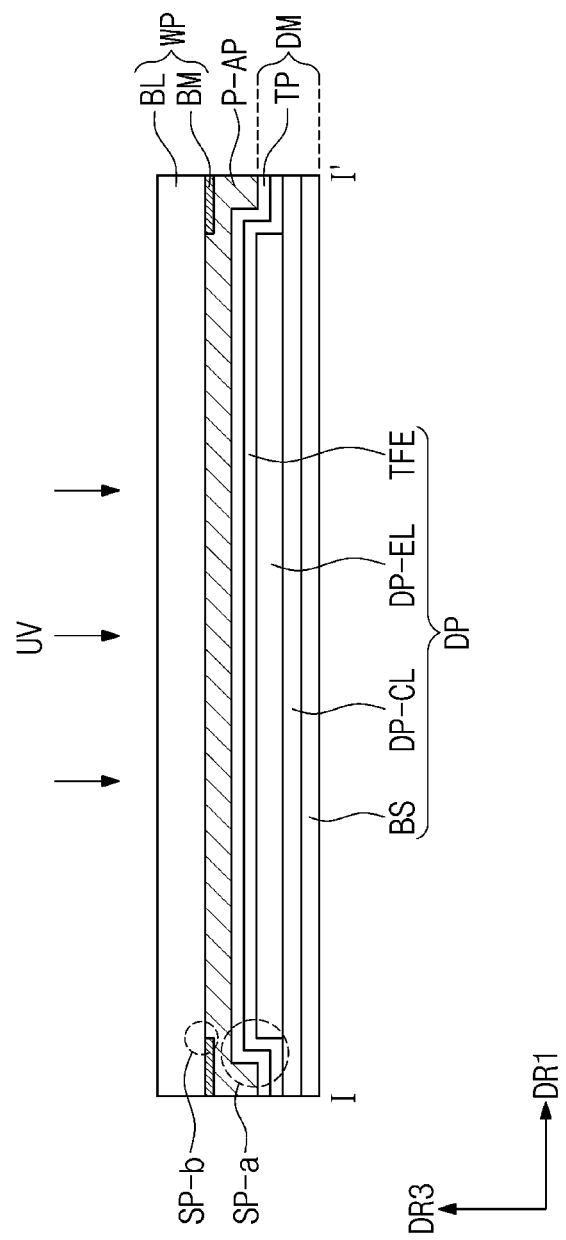
FIG. 4B is a view showing a method for preparing an adhesive member according to an embodiment of the present inventive concept.

FIG. 4A and FIG. 4B are views schematically illustrating a method for preparing the adhesive member AP according to an embodiment of the present inventive concept. FIG. 4A shows a step of providing a resin composition RC on the display module DM. FIG. 4B shows a step of irradiating a preliminary adhesive member P-AP, which is formed from the resin composition RC, with ultraviolet light.

Referring to FIG. 4A, a liquid resin composition RC may be provided between the display module DM and the window WP. For example, resin composition RC may include at least one (meth)acrylate monomer, at least one urethane (meth)acrylate oligomer, and at least one photoinitiator. In addition, the resin composition RC may further include an organic solvent.

The resin composition RC has a viscosity of about 5 cP to less than about 50 cP as measured at a temperature of about 25° C. according to JISK2283, and may be provided through a nozzle NZ. The resin composition RC having a viscosity of about 5 cP to less than about 50 cP exhibits properties of being easily discharged from the nozzle NZ, and may be provided to be applied in a substantially uniform thickness. In addition, the resin composition RC may be provided such that a relatively thin adhesive member AP may be formed.

The resin composition RC having a viscosity of about 5 cP to less than about 50 cP as measured at a temperature of about 25° C. according to JISK2283 may be provided on the display module DM and may cover a bending of a step portion SP-a of the display module DM. Since the resin composition RC has a relatively low viscosity value of less than about 50 cP, the resin composition RC may be applied without leaving an empty space between the resin composition and the display module DM in a portion where there is a bending such as the step portion SP-a. In addition, the resin composition RC having a viscosity value of about 5 cP or greater may be uniformly applied to have a predetermined thickness in a portion to which the resin composition RC is to be provided, that is, without flowing out of the display module DM.

On the preliminary adhesive member P-AP provided by applying the resin composition RC to a predetermined thickness, the window WP may be provided. Ultraviolet light UV for curing the resin composition RC may be transmitted through the window WP. When the window WP is provided on the preliminary adhesive member P-AP, the resin composition RC may fill a step portion SP-b without leaving an empty space. That is, since the resin composition RC has a relatively low viscosity value of less than about 50 cP, the preliminary adhesive member P-AP may be provided in a portion having a bending such as the step portion SP-b formed with the base layer BL and the print layer BM while covering the shape of the bending. The preliminary adhesive member P-AP may be polymerized and then cured by the provided ultraviolet light UV to be formed as the adhesive member AP. A final adhesive member AP (see FIG. 3) provided to the display device DD (see FIG. 3) may have a 180° peel force of about 2000 gf/25 mm to less than about 8000 gf/25 mm at a temperature of about −20° C. In addition, the final adhesive member AP may have a 180° peel force of about 400 gf/25 mm or greater at a temperature of about 60° C.

In addition, unlike what is illustrated in FIG. 4B, the ultraviolet light UV may be provided to the preliminary adhesive member P-AP before the window WP is provided on the preliminary adhesive member P-AP, so that a polymerization reaction may proceed in the resin composition RC. The amount of irradiated ultraviolet light UV may be an amount of light which may completely cure the resin composition RC. However, the resin composition RC may be partially subjected to a polymerization reaction while being in the state of the preliminary adhesive member P-AP, and then after the window WP is provided, unreacted resin composition RC may be further reacted to form the final adhesive member AP.

Figure 5A:
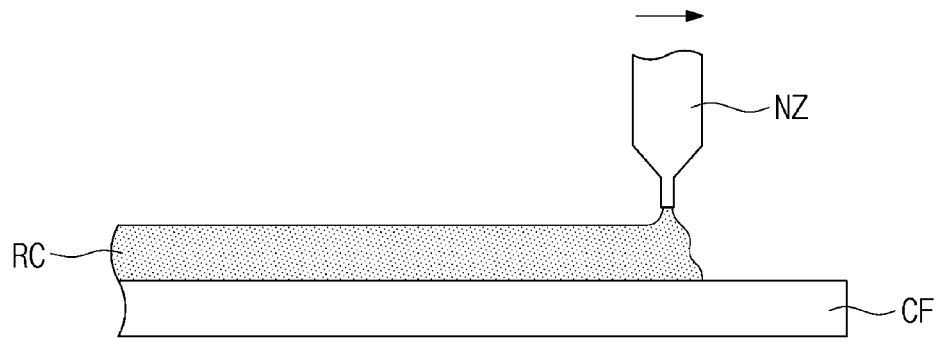
FIG. 5A is a view showing a method for preparing an adhesive member according to an embodiment of the present inventive concept.
Figure 5B:
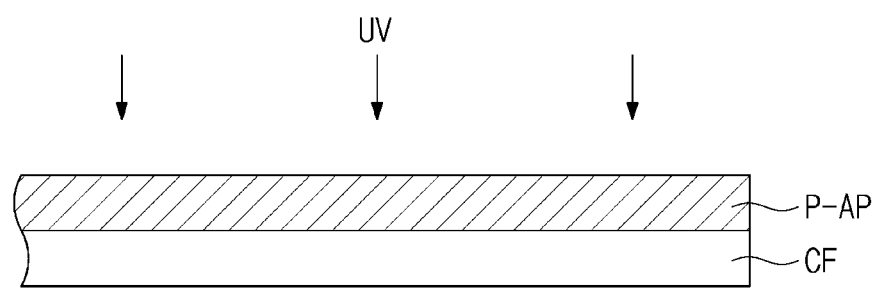
FIG. 5B is a view showing a method for preparing an adhesive member according to an embodiment of the present inventive concept.
Figure 5C:
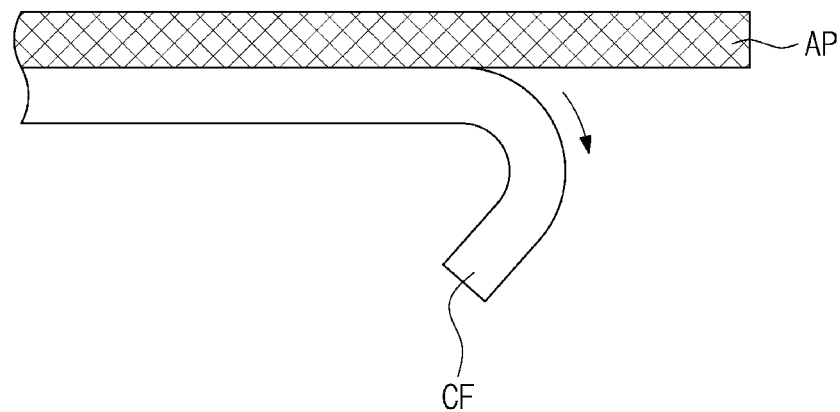
FIG. 5C is a view showing a method for preparing an adhesive member according to an embodiment of the present inventive concept.

FIG. 5A to FIG. 5C show steps of preparing an adhesive member AP which is prepared by a method different from the method for preparing the adhesive member AP described with reference to FIG. 4A and FIG. 4B, and then provided to the display device DD. FIG. 5A shows a step of providing a resin composition RC for forming the adhesive member AP. FIG. 5B shows a step of irradiating ultraviolet light, and FIG. 5C shows a step of removing a carrier film CF.

Referring to FIG. 5A to FIG. 5C, the resin composition RC according to an embodiment of the present inventive concept may be provided on the carrier film CF. For example, a polyethylene terephthalate (PET) film and the like may be used as the carrier film CF, but the present embodiment of the present inventive concept is not limited thereto. The carrier film CF serves as a substrate on which a liquid resin composition RC may be coated, and any one which may be easily detached from the adhesive member AP after ultraviolet curing may be used. For example, one surface of the carrier film CF on which the resin composition RC is provided may be release-treated.

The resin composition RC may be provided by a method such as an inkjet printing method or a dispensing application method. The resin composition RC according to an embodiment of the present inventive concept has a viscosity value of about 5 cP to less than about 50 cP at about 25° C., and thus, may be easily discharged from the nozzle NZ and the like, and may be provided to be applied to have a uniform thickness.

A preliminary adhesive member P-AP provided by coating the resin composition RC to a predetermined thickness may be irradiated with ultraviolet light UV. FIG. 5B illustrates that the coated preliminary adhesive member P-AP is irradiated with the ultraviolet light UV, but the present embodiment of the present inventive concept is not limited thereto. An auxiliary carrier film may be disposed on the preliminary adhesive member P-AP, and the auxiliary carrier film transmits ultraviolet light and may cover the preliminary adhesive member P-AP during an ultraviolet curing process.

The adhesive member AP may be formed after the ultraviolet curing. The adhesive member AP, which is finally prepared by removing the carrier film CF therefrom, may have a 180° peel force of about 2000 gf/25 mm to less than about 8000 gf/25 mm at a temperature of about −20° C. In addition, the finally prepared adhesive member AP may have a 180° peel force of about 400 gf/25 mm or greater at a temperature of about 60° C.

The adhesive member AP prepared through the steps of FIG. 5A to FIG. 5C may be applied to the display device DD. For example, one surface of the adhesive member AP may be attached on the display module DM, and then the window WP may be subsequently attached to the other surface of the adhesive member AP which is opposite to the one surface of the adhesive member AP that is attached to the display module DM. In addition, one surface of the adhesive member AP may be attached on one surface of the window WP, which is to face the display module DM, and then the other surface of the adhesive member AP which is opposite to the one surface of the adhesive member AP may be attached to the display module DM to provide the adhesive member AP to the display device DD.

The adhesive member AP according to an embodiment of the present inventive concept may include a polymer derived from the resin composition RC. The display device DD including the adhesive member AP according to an embodiment of the present inventive concept may use the adhesive member AP to maintain the state in which the window WP, the display module DM, and the like are adhered to each other without the lift-off of the adhesive member AP even if the display device DD is folded or bent.

Figure 6:
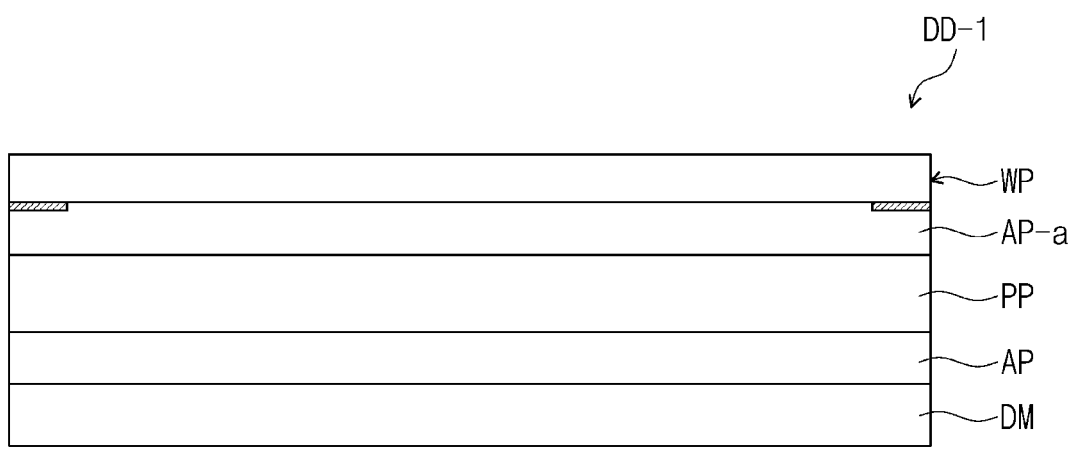
FIG. 6 is a cross-sectional view of a display device according to an embodiment of the present inventive concept.

FIG. 6 is a cross-sectional view showing a display device according to an embodiment of the present inventive concept. Hereinafter, in the description of the display device illustrated in FIG. 6, the same contents and elements as those described with reference to FIG. 1A to FIG. 5C will not be described again, and instead, differences will be mainly described.

Compared to the display device DD described with reference to FIG. 2 and FIG. 3, a display device DD-1 illustrated in FIG. 6 may further include a light control layer PP and an optical adhesive layer AP-a. The display device DD-1 according to an embodiment of the present inventive concept may further include the light control layer PP and the optical adhesive layer AP-a. The light control layer PP may be disposed between the adhesive member AP and the window WP, and the optical adhesive layer AP-a may be disposed between the light control layer PP and the window WP.

The light control layer PP may be disposed on the display panel DP to control reflective light in the display panel DP by external light. The light control layer PP may include, for example, a polarizing layer or a color filter layer.

The optical adhesive layer AP-a may be an optically clear adhesive (OCA) film or an optically clear adhesive (OCR) resin layer. The optical adhesive layer AP-a may also be formed from the resin composition according to an embodiment of the present inventive concept as in the case of the adhesive member AP (see FIG. 4) according to an embodiment of the present inventive concept described above. For example, the optical adhesive layer AP-a may include a polymer derived from the resin composition RC having a viscosity of about 5 cP to less than about 50 cP as measured at a temperature of about 25° C. according to JISK2283.

The optical adhesive layer AP-a formed from the resin composition RC according to an embodiment of the present inventive concept may have a 180° peel force of about 2000 gf/25 mm to less than about 8000 gf/25 mm at a temperature of about 0° C. or lower, for example, at a temperature of about −20° C. In addition, the optical adhesive layer AP-a formed from the resin composition RC according to an embodiment of the present inventive concept may have a 180° peel force of about 400 gf/25 mm or greater at a temperature of about 40° C. or higher, for example, at a temperature of about 60° C. Accordingly, the optical adhesive layer AP-a may have increased reliability in high-temperature and low-temperature environments. The optical adhesive layer AP-a disposed between the light control layer PP and the window WP may exhibit properties of having high adhesion reliability. In addition, the display device DD-1 including the optical adhesive layer AP-1 and the adhesive member AP may exhibit excellent reliability even when folding and unfolding are repeated.

Figure 7:
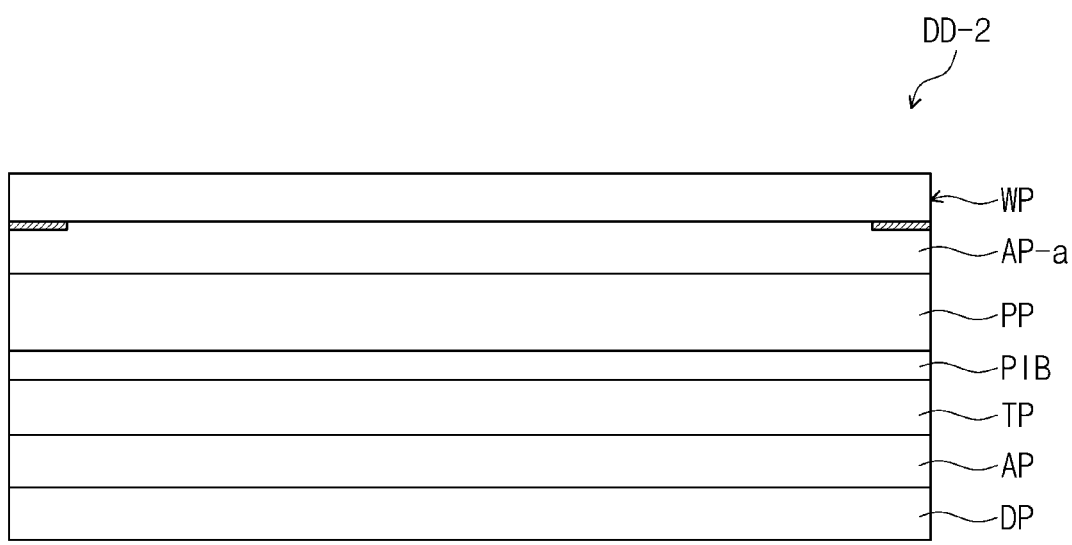
FIG. 7 is a cross-sectional view of a display device according to an embodiment of the present inventive concept.

FIG. 7 is a cross-sectional view illustrating a display device according to an embodiment of the present inventive concept. Hereinafter, in the description of the display device according to an embodiment of the present inventive concept illustrated in FIG. 7, the same contents and elements as those described above with reference to FIG. 1A to FIG. 6 will not be described again, and instead, differences will be mainly described.

Compared to the display device DD described with reference to FIG. 2 and FIG. 3, a display device DD-2 according to an embodiment of the present inventive concept illustrated in FIG. 7 may further include the light control layer PP, the optical adhesive layer AP-a, and an interlayer adhesive layer PIB. The display device DD-2 according to an embodiment of the present inventive concept may further include the light control layer PP and the optical adhesive layer AP-a as in the case of the display device DD-1 according to an embodiment of the present inventive concept illustrated in FIG. 6. The light control layer PP may be disposed between the adhesive member AP and the window WP, and the optical adhesive layer AP-a may be disposed between the light control layer PP and the window WP.

In the display device DD-2 according to an embodiment of the present inventive concept, the adhesive member AP may be provided between the display panel DP and the input sensing unit TP. For example, the input sensing unit TP is not directly disposed on the display panel DP, but instead, the display panel DP and the input sensing unit TP may be coupled to each other by the adhesive member AP. For example, the adhesive member AP may be disposed between the input sensing unit TP and the display panel DP. For example, the adhesive member AP may be disposed between the encapsulation layer TFE (see FIG. 4) of the display panel DP and the input sensing unit TP.

Below the light control layer PP, the interlayer adhesive layer PIB may be provided. The interlayer adhesive layer PIB is disposed between the input sensing unit TP and the light control layer PP, and may be formed of an adhesive material having excellent moisture permeability prevention properties. For example, the interlayer adhesive layer PIB may be formed by including polyisobutylene. The interlayer adhesive layer PIB may be disposed on the input sensing unit TP to prevent the corrosion of sensing electrodes of the input sensing unit TP. The display device DD-2 according to an embodiment of the present inventive concept includes the optical adhesive layer AP-a and the adhesive member AP formed from the resin composition RC according to an embodiment of the present inventive concept, and the display device DD-2 including the optical adhesive layer AP-a and the adhesive member AP may exhibit excellent reliability when folding and unfolding of the display device DD-2 are repeated.

Hereinafter, referring to examples and comparative examples, an adhesive member and a display device formed from the resin composition according to an embodiment of the present inventive concept will be described in detail. In addition, examples discussed below are for illustrative purposes only to facilitate the understanding of the present inventive concept, and thus, the scope of the present inventive concept is not limited thereto.

EXAMPLES

1. Resin Composition Preparation 1

Resin compositions of examples and comparative examples were prepared according to blending ratios listed in Tables 1 and 2. Materials listed in Tables 1 and 2 were provided to a heat-resistant light-shielding container in respective weight ratios. In addition, as a photoinitiator, Ominirad TPO-H (e.g., IGM Resin Co., Ltd.), Esacure 3644 (e.g., IGM Resin Co., Ltd.), Photomer4250 IGM Resin Co., Ltd.), and Omnirad819 (e.g., IGM Resin Co., Ltd.) were mixed in a weight ratio of 60:10:1:30 and provided in an amount of 2 wt % based on the total weight of a resin composition. Thereafter, the resin compositions of examples and comparative examples were respectively prepared by stirring at 1000 rpm for 30 minutes using a co-rotating type stirring and defoaming device (e.g., a product of SHASHIN KAGAKU Co., Ltd.) such that the composition is uniformly mixed.

<Data on Photopolymerization Initiators>
  Ominirad TPO-H: (2,4,6-trimethylbenzoyl)-diphenylphosphine oxide (e.g., a self-cleavage type radical polymerization initiator, IGM Resins Co., Ltd.)
  Esacure 3644: ketocumarine (e.g., a hydrogen-drawing type radical polymerization initiator, IGM Resins Co., Ltd.)
  Photomer4250: hexahydro-1H-azepinacid-2,2-bis[[(1-oxo-2-prophenyl)-oxy]methyl]butyl (e.g., a curing accelerator, IGM Resins Co., Ltd.)
  Omnirad819: phenylbis(2,4,6-trimethylbenzoyl)phosphine oxide (e.g., a self-cleavage type radical polymerization initiator, IGM Resins Co., Ltd.)

TABLE 1

| Materials | Example 1 | Example 2 | Example 3 | Example 4 | Example 5 |
|---|---|---|---|---|---|
| IDAA | — | 35 | 30 | — | 30 |
| 2-EHA | 85 | 35 | 50 | 80 | 45 |
| 4-HBA | 5 | 15 | 5 | 10 | 10 |
| Viscoat#260 | 0.4 | 0.1 | 0.2 | — | — |
| UF-C052 | 5 | 15 | 10 | — | — |
| UV-3700B | 5 | — | 5 | 10 | 15 |

TABLE 2

| Materials | Comparative Example 1 | Comparative Example 2 | Comparative Example 3 | Comparative Example 4 | Comparative Example 5 | Comparative Example 6 |
|---|---|---|---|---|---|---|
| IDAA | — | 70 | — | — | — | — |
| 2-EHA | 80 | — | 60 | 65 | 30 | 40 |
| 4-HBA | — | 10 | 30 | 15 | — | — |
| Viscoat#260 | 5 | 10 | — | — | — | — |
| HEA | — | — | — | — | 30 | 20 |
| UF-C052 | 10 | — | — | — | — | — |
| UV-3700B | 5 | 10 | 10 | 20 | — | — |
| UF-C051 | — | — | — | — | 40 | 40 |

<Data on the Materials of Table 1 and Table 2>
  IDAA iso-decyl acrylate, (e.g., OSAKA ORGANIC CHEMICAL INDUSTRY LTD.)
  2-EHA: 2-ethylhexyl acrylate, (e.g., Mitsubishi Chemical Corporation)
  4-HBA: 4-hydroxybutyl acrylate, (e.g., OSAKA ORGANIC CHEMICAL INDUSTRY LTD.)
  Viscoat #260: L9-nonanediol diacrylate, (e.g., OSAKA ORGANIC CHEMICAL INDUSTRY LTD.)
  HEA: hydroxyethyl acrylate, (e.g., OSAKA ORGANIC CHEMICAL INDUSTRY LTD.)
  UF-0052: urethane acrylate with a molecular weight of 10000 (e.g., KYOEISHA CHEMICAL Co., LTD)
  UV-3700B: urethane acrylate with a molecular weight of 38000 (e.g., Mitsubishi Chemical)
  UF-0051: urethane acrylate with a molecular weight of 35000 (e.g., KYOEISHA CHEMICAL Co., LTD)

In Tables 1 and 2, IDAA, 2-EHA, 4-HBA, and HEA correspond to monomers. UF-0052, UV-3700B, and UF-0051 correspond to oligomers. Viscoat #260 corresponds to a crosslinking agent, which is used in an amount of 0.1 times to 0.4 times with respect to 100 wt % of the sum of weights of the monomers and the oligomers. The resin compositions of Comparative Example 5 and Comparative Example 6 are compositions respectively corresponding to Example 1 and Example 3 in Table 1 of Patent Document JP 2015-531804. In addition, Patent Document JP 2015-531804 relates to an adhesive sheet, which cannot be provided by an inkjet printing method.

2. Resin Composition and Adhesive Member Evaluation 1

Table 3 below shows the evaluation of the viscosity of the resin composition and the inkjet printing providing the resin composition of each of Examples 1 to 5 of Table 1. Table 3 further shows the status of the adhesive member, the glass transition temperature, peel force, thermal expansion stress, and folding reliability of the adhesive member. Table 4 shows the evaluation of the viscosity of the resin composition and inkjet printing providing the resin composition of each of Comparative Examples 1 to 6 of Table 2. Table 4 further shows the glass transition temperature of the adhesive member, the status after curing, peel force, thermal expansion stress, and folding reliability of the adhesive member.

The inkjet printing providing of the resin composition was to evaluate whether it is possible to uniformly provide the resin composition by an inkjet printing method, and the status of the adhesive member after curing was observed with the naked eye after performing curing by providing ultraviolet light to the resin composition. Hereinafter, the evaluation methods will be described in more detail.

[Evaluation of Viscosity of Resin Composition]

The viscosity of a resin composition described in the present specification was measured at a temperature of 25° C. according to JISK2283. The viscosity of each of the resin compositions was measured under the rate condition of 10 rpm using a viscometer TVE-25L (e.g., TOKI SANGYO Co. Ltd.).

[Inkjet Printing Providing of Resin Composition]

Each of the prepared resin compositions was applied using an inkjet printer, and each of the prepared compositions was cured by being provided with UV. The appearance of a cured product after the curing was observed with the naked eye. In Table 3 and Table 4, when the resin composition was discharged to be applied to a uniform thickness, it is denoted by and when the resin composition was not discharged, it is denoted by "X."

[Evaluation of Status of Adhesive Member]

Each of the resin compositions of Examples and Comparative Examples was applied on a soda-lime glass (e.g., a product of Central Glass Co., Ltd.) to have a thickness of 50 μm. Thereafter, using UV-LED lamps respectively having peaks at wavelengths of 405 nm and 365 nm, ultraviolet light was irradiated such that accumulated amounts of light were respectively 220 mJ/cm$^2$ and 380 mJ/cm$^2$ to form a temporary cured layer. A PET film (e.g., TOYOBO Co., Ltd., product name A4360, thickness 50 μm) was provided on the temporary cured layer, and using an automatic heating and pressing processing device (e.g., a product of Chiyoda Electronics Co., Ltd., product name ACS-230), bonding processing was performed for 5 minutes under the conditions of 30° C. and 0.5 MPa. Next, using a UV-LED having a peak at a wavelength of 395 nm, ultraviolet light was irradiated such that an accumulated amount of light was 4000 mJ/cm$^2$ to obtain a laminate including an adhesive member. The appearance of the obtained laminate was observed with the naked eye, and then denoted by "⊚" or "X" in Tables 3 and 4. "⊚" indicates that there is no white turbidity and curing defects, and "X" indicates that there is white turbidity or curing defects.

[Measurement of Glass Transition Temperature of Adhesive Member]

On a slide glass (e.g., a product of Matsunami Glass Ind., Ltd., slide glass S1112), a release-treated PET film (e.g., a product of PANAC Co., Ltd., NP100A), and a silicon rubber sheet (e.g., a product of TIGERS POLYMER CORPORATION) having a hole with a diameter of 8 mm were sequentially laminated. 28 μL of the blended resin composition of each of Examples and Comparative Examples was dropped into the hole of the silicon rubber, and using UV-LED lamps, which respectively have peaks at wavelengths of 405 urn and 365 nm, ultraviolet light was irradiated such that accumulated amounts of light were respectively 220 mJ/cm$^2$ and 380 mJ/cm$^2$. Thereafter, a release-treated PET film (e.g., a product of PANAC Co., Ltd., NP100A) and a slide glass (e.g., a product of Matsunami Glass Ind., Ltd., slide glass S1112) were sequentially laminated. After the irradiation, the resin composition was cured by irradiating ultraviolet light on the side of the laminated slide glass using a UV-LED lamp having a peak at a wavelength of 395 nm such that an accumulated amount of light was 4000 mJ/cm$^2$ to obtain a measurement sample with a diameter of 8 mm and a thickness of 500 μm. The glass transition temperature (Tg) of the obtained measurement sample was measured using a dynamic viscoelasticity measuring device (e.g., a product of Anton Paar Japan K.K., MCR302). The glass transition temperature was measured under the measurement conditions of a frequency of 1 Hz, a temperature range of −80° C. to 80° C., and a temperature raising rate of 10° C./min.

[Measurement of Peel Force of Adhesive Member]

Each of the resin compositions of Examples and Comparative Examples was applied on a soda-lime glass (e.g., a product of Central Glass Co. Ltd.) to a thickness of 50 μm. Thereafter, using UV-LED lamps, which respectively have peaks at wavelengths of 405 nm and 365 nm, ultraviolet light was irradiated such that accumulated amounts of light were respectively 220 mJ/cm$^2$ and 380 mJ/cm$^2$ to form a temporary cured layer. A PET film (e.g., TOYOBO Co., Ltd., product name A4360, thickness 50 μm) was provided on the formed temporary cured layer, and using an automatic heating and pressing processing device (e.g., a product of Chiyoda Electronics Co., Ltd., product name ACS-230), bonding processing was performed for 5 minutes under the conditions of a temperature of 30° C. and 0.5 MPa.

Next, using a UV-LED having a peak at a wavelength of 395 nm, ultraviolet light was irradiated such that an accumulated amount of light was 4000 mJ/cm$^2$ to obtain a laminate. The 180° peel force of the obtained laminate was measured using a tensile tester (e.g., a product of INSTRON Co., Ltd., an INSTRON 5965 type). The 180° peel force was measured at a tensile rate of 300 mm/min in a constant temperature bath of −20° C. or in a constant temperature bath of 10° C.

[Measurement of Thermal Expansion Stress of Adhesive Member]

From the resin composition of each of Examples and Comparative Examples, a measurement sample with a diameter of 8 mm and a thickness of 500 μm was obtained in the same manner as in the glass transition temperature measurement of the adhesive member described above. The thermal expansion stress of the obtained measurement sample was measured using a dynamic viscoelasticity measuring device (e.g., a product of Anton Paar Japan K.K., MCR302). The stress at −20° C. was set to 0 N/mm$^2$, and the gap height was fixed at 500 μm, and the thermal expansion stress in accordance with changes in temperature from −20° C. to 60° C. was measured while raising the temperature from −20° C. to 60° C. at a temperature raising rate of 10° C./min.

[Evaluation of Folding Reliability of Adhesive Member]

Each of the resin compositions of Examples and Comparative Examples was applied to a thickness of 50 μm on a PET film with a thickness of 50 μm. Using UV-LED lamps, which respectively have peaks at wavelengths of 405 nm and 365 nm, ultraviolet light was irradiated such that accumulated amounts of light were respectively 220 mJ/cm$^2$ and 380 mJ/cm$^2$ to form a temporary cured layer. A PET film (e.g., TOYOBO Co., Ltd., product name A4360, thickness 50 μm) was provided on the formed temporary cured layer, and using an automatic heating and pressing processing device (e.g., a product of Chiyoda Electronics Co., Ltd., product name ACS-230), bonding processing was performed for 5 minutes under the conditions of a temperature of 30° C. and 0.5 MPa. Thereafter, using a UV-LED, which has a peak at a wavelength of 395 nm, ultraviolet light was irradiated such that an accumulated amount of light was 4000 mJ/cm$^2$ to obtain a laminate having a size of 50 mm×100 mm. Using a planar body no-load U-shaped stretch tester (e.g., a product of YUASA SYSTEM Co., Ltd.), a bending jig was installed on a short side of the obtained laminate, and the laminate was maintained in a cold/heat shock device for 240 hours. With a bending angle of 180° and a bending radius of 3 mm, the laminate was maintained at a temperature of −20° C. for 30 minutes and then at a temperature of 60° C. for 30 minutes. The above was repeated 240 times, and the laminate was observed with the naked eye.

In Tables 3 and 4, "⊚" indicates that there was no change in the appearance of the laminate, and "deformed" indicates that the deformation of the adhesive member and fold marks due to bending were observed. "Peeled off" indicates that the PET film was peeled off from the adhesive member, and "damaged" indicates that the adhesive member was damaged. "Air bubbles" indicates that air bubbles were generated inside the adhesive member, or lift-off was observed between the adhesive member and the PET film.

TABLE 3

| Classifications | Example 1 | Example 2 | Example 3 | Example 4 | Example 5 |
|---|---|---|---|---|---|
| 25° C., viscosity (cP) | 6 | 10 | 14 | 28 | 48 |
| Glass transition temperature (Tg. ° C.) | −68 | −54 | −52 | −44 | −40 |
| Adhesive member status | ⊚ | ⊚ | ⊚ | ⊚ | ⊚ |
| Inkjet printing providing | ⊚ | ⊚ | ⊚ | ⊚ | ⊚ |
| −20° C., 180° peel force (gf/25 mm) | 2200 | 5800 | 4100 | 6300 | 7700 |
| 60° C., 180° peel force (gf/25 mm) | 410 | 620 | 480 | 510 | 710 |
| Thermal expansion stress (N/mm$^2$) | 0.12 | 1.93 | 0.48 | 1.32 | 0.96 |
| Folding reliability | ⊚ | ⊚ | ⊚ | ⊚ | ⊚ |

TABLE 4

| Classifications | Comparative Example 1 | Comparative Example 2 | Comparative Example 3 | Comparative Example 4 | Comparative Example 5 | Comparative Example 6 |
|---|---|---|---|---|---|---|
| 25° C., viscosity (cP) | 24 | 29 | 42 | 71 | 2600 | 2200 |
| Glass transition temperature (Tg. ° C.) | −65 | −43 | −18 | −39 | −25 | −35 |
| Adhesive member stants | ⊚ | ⊚ | ⊚ | ⊚ | ⊚ | ⊚ |
| Inkjet printing providing | ⊚ | ⊚ | ⊚ | X | X | X |
| −20° C. 180° peel force (gf/25 mm) | 400 | 2300 | 7400 | 5800 | 1600 | 1900 |
| 60° C, 180° peel force (gf/25 mm) | 60 | 370 | 770 | 490 | 260 | 240 |
| Thermal expansion stress (N/mm$^2$) | 0.49 | 2.4 | 4.2 | 2.9 | 4.2 | 3 6 |
| folding reliability | Peeled off | Peeled off, deformed | Damaged | Deformed, air bubbles | Peeled off, deformed | Peeled off, deformed |

Referring to Table 3, it can be seen that the resin compositions of Examples 1 to 5 each have a viscosity of about 5 cP to less than about 50 cP at a temperature of about 25° C., and have excellent evaluation results when provided by inkjet printing. It can be seen that the adhesive members formed by curing the resin compositions of Examples 1 to 5 had no white turbidity and curing defects.

The adhesive members formed from the resin compositions of Examples 1 to 5 each have a glass transition temperature of about −70° C. to lower than about −30° C., and a thermal expansion stress of about 0.1 N/mm$^2$ to less than about 2 N/mm$^2$ in accordance with changes in temperature from about −20° C. to about 60° C. Each of the resin compositions of Examples 1 to 5 is the resin composition according to an embodiment of the present inventive concept, and it can be seen that an adhesive member formed from the resin composition according to an embodiment of the present inventive concept has excellent folding reliability in low-temperature and high-temperature environments of about −20° C. to about 60° C.

In addition, it can be seen that the adhesive members, which are formed from the resin compositions of Examples 1 to 5, each have a 180° peel force of about 2000 gf/25 mm to less than about 8000 gf/25 mm at a temperature of about −20° C., and a 180° peel force of about 400 gf/25 mm or greater at a temperature of about 60° C. Accordingly, it can be determined that an adhesive member formed from the resin composition according to an embodiment of the present inventive concept may have excellent folding reliability and excellent adhesion reliability in low-temperature and high-temperature environments.

Referring to Table 4, it can be seen that the adhesive members, which are formed by curing the resin compositions of Comparative Example 1 to 6, had no white turbidity and curing defects. The adhesive member, which was formed from the resin composition of Comparative Example 1, had a 180° peel force of less than about 2000 gf/25 mm at a temperature of about −20° C., and a 180° peel force of less than about 400 gf/25 mm at a temperature of about 60° C., so that it can be seen that the adhesive member was peeled off during, the evaluation of folding reliability. The adhesive member formed from the resin composition of Comparative Example 1 had a small 180° peel force value at a temperature of about −20° C., so that the adhesive member was peeled off due to internal stress of the adhesive member generated in an environment having a temperature of about −20° C. during the evaluation of folding reliability.

The adhesive member, which was formed from the resin composition of Comparative Example 2, had a thermal expansion stress of about 2 N/mm$^2$ or greater in accordance with changes in temperature, so that it can be seen that the adhesive member was peeled off and deformed during the evaluation of folding reliability. The adhesive member, which was formed from the resin composition of Comparative Example 2, had a large thermal expansion stress value in accordance with changes in temperature, so that the adhesive member was peeled off and deformed due to repeated temperature changes during the evaluation of folding reliability.

The adhesive member formed from the resin composition of Comparative Example 3 had a glass transition temperature of about −30° C. or higher, and a thermal expansion stress of about 2 N/mm$^2$ or greater in accordance with changes in temperature, so that it can be seen that the adhesive member was damaged during the evaluation of folding reliability. The adhesive member formed from the resin composition of Comparative Example 3 had a relatively high glass transition temperature, so that the adhesive member was peeled off and deformed due to internal stress of the adhesive member repeatedly generated during the evaluation of folding reliability.

The resin composition of Comparative Example 4 had a viscosity of about 50 cP or greater at a temperature of about 25° C., and was cut off while being provided by an inkjet printing method. In addition, the adhesive member formed from the resin composition of Comparative Example 4 had a thermal expansion stress of about 2 N/mm² or greater in accordance with changes in temperature, so that it can be seen that lift-off was generated between the adhesive member and the PET film during the evaluation of folding reliability. The adhesive member formed from the resin composition of Comparative Example 4 had a large thermal expansion stress value in accordance with changes in temperature, so that the adhesive member was peeled off and deformed due to repeated temperature changes during the evaluation of folding reliability.

The resin compositions of Comparative Examples 5 and 6 each had a viscosity of about 50 cP or greater at a temperature of about 25° C., and thus, could not be provided by an inkjet printing method due to the high viscosity. In addition, the adhesive members formed from the resin compositions of Comparative Examples 5 and 6 each had a 180° peel force of less than about 2000 gf/25 mm at a temperature of about −20° C., and a thermal expansion stress of about 2 N/mm² or greater in accordance with changes in temperature, so that it can be seen that the adhesive members were peeled off and deformed during, the evaluation of folding reliability.

3. Resin Composition Preparation 2

Resin compositions of Examples and Comparative Examples were prepared according to blending ratios listed in Tables 5. Materials listed in Tables 5 were provided to heat-resistant light-shielding containers in respective weight ratios. In addition, Ominirad TPO-H, Esacure 3644, Photomer4250, and Omnirad819 were mixed in a weight ratio of 60:10:1:30 and provided in an amount of 2 wt % based on the total weight of a resin composition. Ominirad TPO-H, Esacure 3644, and Omnirad819 are photoinitiators, and Photomer4250 is a curing accelerator. Thereafter, each of the resin compositions of Examples and Comparative Examples was prepared by stirring at room temperature such that the resin composition is uniformly mixed. In addition, each of Examples and Comparative Examples of Table 5 further includes an organic solvent unlike Examples of Table 1 and Comparative Examples of Table 2.

TABLE 5

| Materials | Example 6 | Example 7 | Example 8 | Comparative Example 7 | Comparative Example 8 |
|---|---|---|---|---|---|
| 2-EHA | 90 | 90 | 90 | 90 | 90 |
| 4-HBA | 5 | 5 | 5 | 5 | 5 |
| Viscoat#260 | 0.4 | 0.4 | 0.4 | 0.4 | 0.4 |
| UV-3700B | 5 | 5 | 5 | 5 | 5 |
| Methylethyl-ketone | 1 | — | — | 2 | 10 |
| Ethanol | — | 1 | — | — | — |
| Acetone | — | — | 1 | — | — |

<Data on the Materials of Table 5>
methyl ethyl ketone (MEK): molecular weight 72
ethanol: molecular weight 46
acetone: molecular weight 58

In Table 5, each of the resin compositions of Examples 6 to 8 includes an organic solvent in an amount of 1 wt % or less. The resin composition including an organic solvent in an amount of 1 wt % or less does not require a process for drying the organic solvent. Accordingly, an adhesive member formed from the resin composition including an organic solvent in an amount of 1 wt % or less may exhibit properties of having increased production efficiency. In addition, each of the resin compositions of Comparative Examples 7 and 8 includes an organic solvent in an amount greater than 1 wt %, and requires a process for drying the organic solvent.

4. Resin Composition and Adhesive Member Evaluation 2

Table 6 below shows the evaluation of the viscosity of the resin composition and the inkjet printing providing the resin composition of each of Examples 6 to 8 and Comparative Examples 7 and 8 of Table 5. Table 6 further shows the glass transition temperature of the adhesive member, the status, peel force, thermal expansion stress, and folding reliability of the adhesive member. The evaluation methods of Table 6 were the same as those of Tables 3 and 4.

TABLE 6

| Classifications | Example 6 | Example 7 | Example 8 | Comparative Example 7 | Comparative Example 8 |
|---|---|---|---|---|---|
| 25° C., viscosity (cP) | 6 | 6 | 6 | 5 | 4 |
| Glass transition temperature (Tg. ° C.) | −66 | −69 | −68 | −64 | Measurement not possible |
| Adhesive member status | ◎ | ◎ | ◎ | X | X |
| Inkjet printing providing | ◎ | ◎ | ◎ | ◎ | X |
| −20° C., 180° peel force (gf/25 mm) | 2 100 | 2200 | 2200 | 1600 | Measurement not possible |
| 60° C., 180° peel force (gf/25 mm) | 430 | 420 | 430 | 340 | Measurement not possible |
| Thermal expansion stress (N/mm²) | 0.16 | 0.18 | 0.19 | 0.45 | Measurement not possible |
| Folding reliability | ◎ | ◎ | ◎ | Peeled off | Damaged |

Referring to Table 6, the resin compositions of Examples 6 to 8 each have a viscosity of about 5 cP to less than about 50 cP at a temperature of about 25° C., so that it can be seen that the resin compositions had stable discharge properties when provided by an inkjet printing method. It can be seen that the adhesive members formed by curing the resin compositions of Examples 6 to 8 had no white turbidity and curing defects.

The adhesive members formed from the resin compositions of Examples 6 to 8 each have a glass transition temperature of about −70° C. to lower than about −30° C., and a thermal expansion stress of about 0.1 N/mm to less than about 2 N/mm² in accordance with changes in temperature from about −20° C. to about 60° C. Each of the resin compositions of Examples 6 to 8 is the resin composition according to an embodiment of the present inventive concept, and it can be seen that an adhesive member formed from the resin composition according to an embodiment of the present inventive concept has excellent folding reliability in low-temperature and high-temperature environments of about −20° C. to about 60° C.

In addition, it can be seen that the adhesive members formed from the resin compositions of Examples 6 to 8 each have a 180° peel force of about 2000 gf/25 mm to less than about 8000 gf/25 mm at a temperature of about −20° C., and a 180° peel force of about 400 gf/25 mm or greater at a temperature of about 60° C. Accordingly, it can be determined that an adhesive member formed from the resin composition according to an embodiment of the present inventive concept may have excellent folding reliability and excellent adhesion reliability in relatively low-temperature and relatively high-temperature environments.

The resin compositions of Comparative Examples 7 and 8 included an organic solvent in an amount greater than about 1 wt % or less, so that it can be seen that the adhesive members formed by curing the resin compositions of Comparative Examples 7 and 8 had white turbidity or curing defects. In addition, due to extremely low adhesion reliability, the adhesive members were peeled off during the evaluation of folding reliability.

An adhesive member according to an embodiment of the present inventive concept is formed from a resin composition according to an embodiment of the present inventive concept, and the resin composition has a viscosity of about 5 cP to less than about 50 cP at a temperature of about 25° C. The resin composition having a viscosity of about 5 cP to less than about 50 cP at a temperature of about 25° C. may be provided by an inkjet printing method or a dispensing application method.

The adhesive member formed from the resin composition according to an embodiment of the present inventive concept may have a 180° peel force of about 2000 gf/25 mm to less than about 8000 gf/25 mm for a glass substrate at a temperature of about −20° C. In addition, the adhesive member may have a thermal expansion stress of about 0.1 N/mm$^2$ to less than about 2 N/mm$^2$ in accordance with changes in temperature from about −20° C. to about 60° C. Accordingly, the adhesive member according to an embodiment of the present inventive concept may exhibit properties of having excellent adhesion reliability and folding reliability in low-temperature and high-temperature environments.

A display device according to an embodiment of the present inventive concept may include a display panel, a window disposed on the display panel, and an adhesive member disposed between the display panel and the window. The display device includes the adhesive member according to an embodiment of the present inventive concept, and thus, may have increased adhesion reliability and folding reliability in accordance with changes in temperature.

An adhesive member according to an embodiment of the present inventive concept may exhibit properties of having excellent adhesion reliability and folding reliability by satisfying a predetermined range of peel force, which is at relatively low temperatures, and thermal expansion stress in accordance with changes in temperature.

A display device according to an embodiment of the present inventive concept may exhibit properties of having excellent adhesion reliability and folding reliability in relatively low-temperature and relatively high-temperature environments by including an adhesive member disposed between a display panel and a window.

While the present inventive concept has been described with reference to embodiments thereof, it will be understood by those of ordinary skill in the art that various changes in form and details may be made thereto without departing from the spirit and scope of the present inventive concept.

What is claimed is:

1. An adhesive member comprising:
   a polymer derived from a resin composition including at least one (meth)acrylate monomer, at least one urethane (meth)acrylate oligomer, and at least one photoinitiator;
   a 180° peel force of about 2000 gf/25 mm to less than about 8000 gf/25 mm for a glass substrate at a temperature of about −20° C.; and
   a thermal expansion stress of about 0.1 N/mm$^2$ to less than about 2 N/mm$^2$ in accordance with changes in temperature from about −20° C. to about 60° C.

2. The adhesive member of claim 1, having a glass transition temperature of −70° C. to lower than −30° C.

3. The adhesive member of claim 1, having a 180° peel force of about 400 gf/25 mm or greater at a temperature of about 60° C.

4. The adhesive member of claim 1, wherein the resin composition has a viscosity of about 5 centipoise (cP) to less than about 50 cP as measured at a temperature of about 25° C.

5. The adhesive member of claim 1, wherein the (meth)acrylate monomer has an weight-average molecular weight of about 100 to about 500.

6. The adhesive member of claim 1, wherein the urethane (meth)acrylate oligomer has an weight-average molecular weight of about 10,000 to less than about 40,000.

7. The adhesive member of claim 1, wherein the urethane (meth)acrylate oligomer comprises a plurality of acryl groups.

8. The adhesive member of claim 1, wherein the resin composition further comprises an organic solvent of about 1 wt % or less based on a total weight of the resin composition.

9. A display device comprising:
   a display panel;
   a window disposed on the display panel; and
   an adhesive member disposed between the display panel and the window, and including a polymer derived from a resin composition having at least one (meth)acrylate monomer, at least one urethane (meth)acrylate oligomer, and at least one photoinitiator,
   wherein the adhesive member has a 180° peel force of about 2000 gf/25 mm to less than about 8000 gf/25 mm for a glass substrate at a temperature of about −20° C., and a thermal expansion stress of about 0.1 N/mm$^2$ to less than about 2 N/mm$^2$ in accordance with changes in temperature from about −20° C. to about 60° C.

10. The display device of claim 9, wherein the adhesive member has a 180° peel force of about 400 gf/25 mm or greater at a temperature of about 60° C.

11. The display device of claim 9, wherein the adhesive member has a glass transition temperature of about −70° C. to lower than about −30° C.

12. The display device of claim 9, wherein the resin composition further comprises an organic solvent of about 1 wt % or less based on a total weight of the resin composition.

13. The display device of claim 9, wherein the resin composition has a viscosity of about 5 cP to less than about 50 cP as measured at a temperature of about 25° C.

14. The display device of claim 9, wherein the adhesive member has a thickness of about 50 μm to about 200 μm.

15. The display device of claim 9, wherein the adhesive member is formed by providing the resin composition on a first surface of the window or on a first surface of the display panel, and by using ultraviolet curing on the provided resin composition.

16. The display device of claim 9, further comprising:
   a light control layer disposed between the adhesive member and the window; and an optical adhesive layer disposed between the light control layer and the window, wherein the optical adhesive layer includes a polymer derived from the resin composition.

17. The display device of claim 16, wherein the optical adhesive layer has a 180° peel force of about 2000 gf/25 mm to less than about 8000 gf/25 mm at a temperature of about −20° C.

18. The display device of claim 16, wherein the optical adhesive layer has a 180° peel force of about 400 gf/25 mm or greater at a temperature of about 60° C.

19. The display device of claim 9, further comprising an input sensing unit disposed on the display panel,
wherein the adhesive member is disposed between the display panel and the input sensing unit or between the input sensing unit and the window.

20. The display device of claim 9, wherein
at least one folding region is defined in the display device, and
the folding region has a radius of curvature of about 5 mm or less.

* * * * *